SATELLITE COMMUNICATION SYSTEMS

Filed Jan. 2, 1963 2 Sheets-Sheet 1

INVENTORS
JOHN KENNETH SAVILE JOWETT &
RICHARD HOLDEN
BY HALL AND HOUGHTON
ATTORNEYS

INVENTORS
JOHN KENNETH SAVILE JOWETT &
RICHARD HOLDEN
HALL AND HOUGHTON
ATTORNEYS 3,351,858

SATELLITE COMMUNICATION SYSTEMS

John Kenneth Savile Jowett, Cheam, and Richard Holden, Hendon, London, England, assignors to Her Majesty's Postmaster General, London, England Filed Jan. 2, 1963, Ser. No. 248,913
Claims priority, application Great Britain, Jan. 8, 1962, 710/62
7 Claims. (Cl. 325—15)

Figure 1:
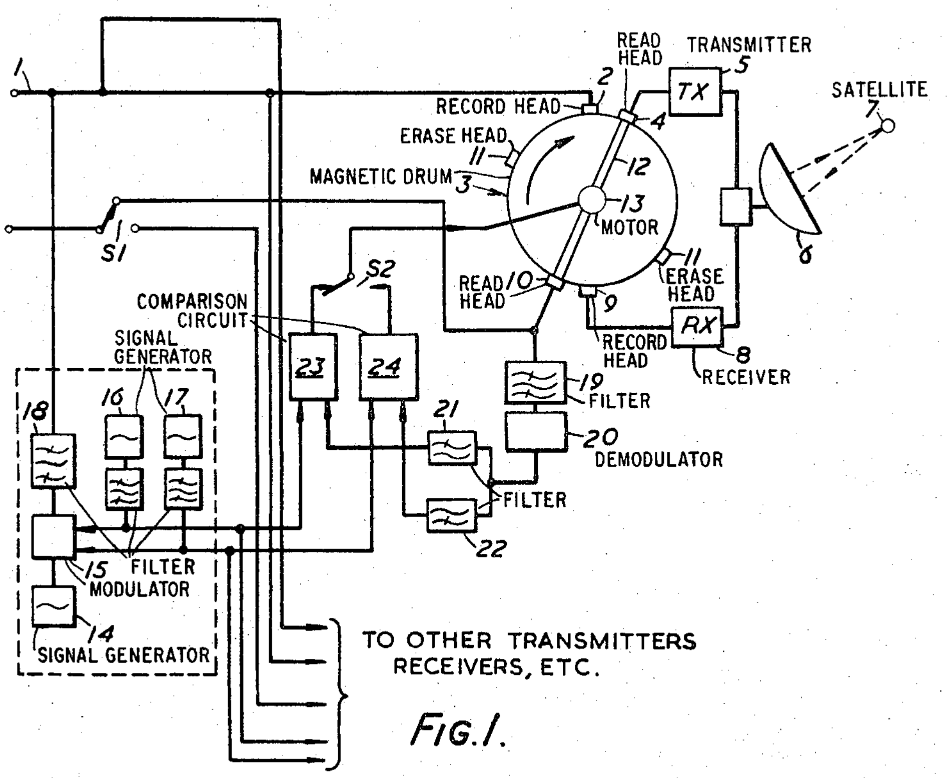

This invention relates to satellite radio communication systems and to apparatus for such systems.

The transmission time for radio signals to travel from one station to another is proportional to the length of the path followed by the radio signals. If one of the two stations is receding from or approaching the other, the path length—and consequently the transmission time—will, in general, also be changing. Also, the relative velocity in the direction joining the two stations will give rise to the well known Doppler frequency shift in which the frequency of a signal as received differs from that of the signal as transmitted by an amount depending upon the transmitted frequency and on the relative velocity in the direction joining the two stations. The Doppler frequency shift is, in general, an undesirable effect and may be of considerable magnitude if either the transmitted frequency or the rate of change of distance is large, as, for example, in satellite communication systems.

According to the present invention a satellite radio communication system includes a plurality of ground stations each comprising a transmitter, a receiver, means for assessing the transmission time of radio signals from the transmitter to the receiver, and, at the transmitter and/or the receiver, a variable time delay unit located in the path of modulating signals to be transmitted by the transmitter and/or in the path of demodulated signals after reception by the receiver, the unit or units being controlled by the means in such manner that a transmission time delay is introduced into the path of the modulating signals and/or of the demodulated signals of such value that, when added to the transmission time of the radio signals, results in a total transmission time for the modulating signals which is constant.

Where the modulating signal comprises a plurality of modulating signal channels, the time delay may be introduced separately into each channel path or into a common path over which all channels are transmitted.

A radio transmitter for use with the system comprises means for assessing the transmission time from the transmitter to a receiver, a variable time delay unit located in the path of modulating signals to be transmitted by the transmitter, the unit being controlled by the means in such manner that a transmission time delay is introduced into the path of the modulating signals of such value that, when added to the transmission time of the radio signals, results in a total transmission time for the modulating signals which is constant.

A radio receiver for use with the system comprises means for assessing the transmission time of radio signals from a transmitter to the receiver, a variable time delay unit located in the path of demodulated signals after reception and demodulation by the receiver, the unit being controlled by the means in such manner that a transmission time delay is introduced into the path of the demodulated signals of such value that, when added to the transmission time of the radio signals, results in a total transmission time which is constant.

The time delay unit may take the form of a closed loop magnetic tape or a magnetic drum movable past two sets of recording and read-out heads. In each set, the heads are movable relatively to each other, the movement in one set being synchronised as to direction and magnitude with that in the other set.

Where the modulating signal comprises a plurality of signal channels and it may be important that these channels do not suffer "stretching" or "contraction." By keeping the total time delay constant, stretching and contracting are eliminated.

In a system embodying the invention, the frequency of the radio carrier wave of the transmitter may be adjusted in accordance with the rate of change of added transmission time delay to compensate for apparent changes in the carrier wave frequency due to Doppler shift. The rate of change of added transmission time delay may also be used to control the receiver of the system, by for example controlling the frequency of the R.F. frequency changer oscillator of the receiver.

Figure 2:
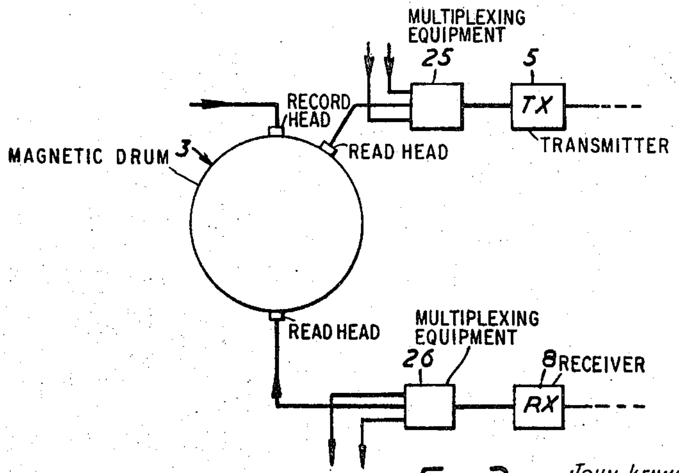
Figure 3:
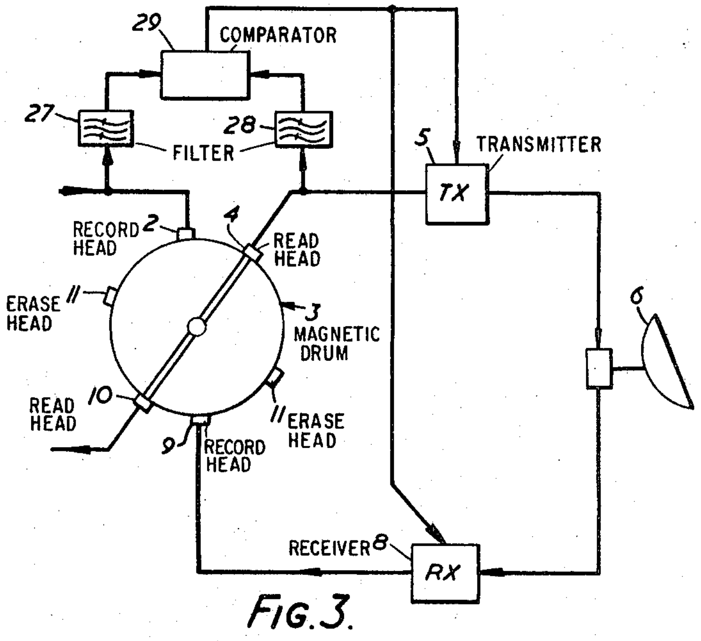
Figure 4:
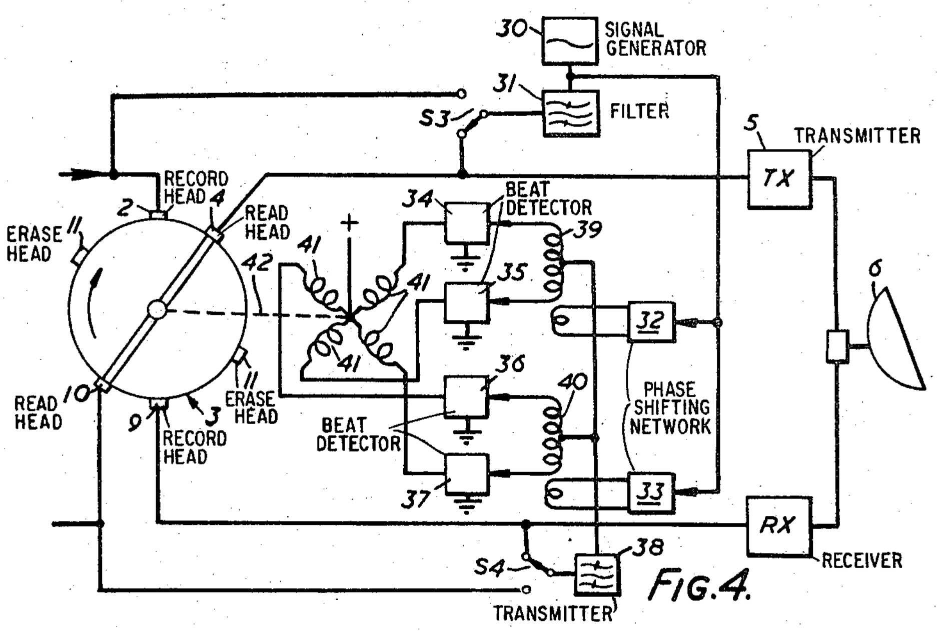

By way of example only, embodiments of the invention suitable for use as a satellite communication system employing active satellites which are not located in the so-called stationary orbit, will now be described with reference to the accompanying drawings of which:

FIG. 1 is a circuit in schematic form only of part of one ground station of the system, FIG. 2 shows part of a modified form of the embodiment shown in FIG. 1, FIG. 3 shows diagrammatically details of a method of carrier frequency and receiver frequency control, and, FIG. 4 shows diagrammatically an alternative method of compensating variations in radio transmission time from transmitter to receiver.

Modulating signals, the so-called baseband signals, are applied to input terminal 1 joined to the recording head 2 of a rotatable magnetic drum 3. The recording head 2 forms with a read-out head 4 a first set of heads on the drum. The output of read-out head 4 is used to modulate a radio carrier wave in transmitter 5. The output of transmitter 5 is beamed by an aerial dish 6 to an active satellite 7 being tracked by the dish 6. Tracking equipment is not shown.

A receiver 8 energised from dish 6 demodulates signals received from the satellite and those signals are applied to recording head 9 which, with read-out head 10, forms a second set of heads on the drum 3. The output of read-out head 10 is fed via switch S1 to a utilising circuit which is not shown. Erase heads 11 are positioned as shown between heads 4 and 9 and between heads 10 and 2.

The read-out heads 4 and 10 are linked together by means indicated diagrammatically by the diametral arm 12 which is rotatable about the axis of rotation of the drum 3 by a motor indicated diagrammatically at 13. The motor is energised in accordance with the output of means for assessing the transmission delay from dish 6 to satellite 7.

A pilot carrier at some frequency within or close to the baseband is produced by an oscillator 14 and is modulated in modulator 15 by the output of a low frequency signal source 16. The frequency of the source 16, is, for example, 10 c./s. The pilot carrier is also simultaneously modulated by a higher frequency signal produced by a second signal source 17 whose frequency is, for example, 100 c./s. The output of the modulator 15 after filtering by bandpass filter 18 is added to the input signal at terminal 1 and is transmitted with the baseband to the satellite 7 and retransmitted by the latter back to ground and received by receiver 8.

The modulated pilot carrier is selected from the output of read-out head 10 by filter 19 and is demodulated by demodulator 20 whose output is broken down into its component modulating signals by further filters 21 and 22. The 10 c./s. output selected by filter 21 is applied to a comparison circuit 23 where its phase is compared with that of the local source 16 the difference in phase representing the total loop transmission time, i.e. the time from recording head 2 to satellite 7 and back to read-out head 10. The comparison circuit 23 produces an output that is proportional to the phase difference and that output is applied via a switch S2 to drive the motor 13 in such a manner as to reduce the phase difference.

Similarly, the 100 c./s. output of demodulator 20 selected by filter 22 is applied to a second phase comparison circuit 24 where the phase of the receiver signal is compared with that of signals from the local source 17. An output proportional to the phase difference is produced by circuit 24 and by means of the switch S2 is applied as described below to drive motor 13.

The output of circuit 23 is first used to secure an approximate adjustment of the position of arm 12 after which the delay control unit operates to connect circuit 24 with motor 13 thereby securing a finer setting of the arm 12. The relative positions of heads 2, 4 and 9, 10 are thus automatically adjusted until the 10 c./s. signal is in phase with the output of source 16 in which condition the total loop transmission time is a multiple of 100 milliseconds (after allowing, if necessary, for any phase shift in filter 21). The 100 c./s. signal is then used as explained above to apply closer correction.

If desired, the 10 and 100 c./s. signals could be added to the input signal to recording head 2 and thus modulated directly on the radio frequency carrier at transmitter 5 without the use of a pilot carrier oscillator. It is not essential to use two low frequency signals. A single signal could be used though the two frequency arrangement is preferred. It will be seen that the total transmission time delay is equal to or a multiple of the period of the low frequency signal, and by using a source of a variable low frequency signal in place of sources 16 and 17, the total transmission time could conveniently be set to any required value by adjustment of the frequency of the variable source.

Thus, in operation, the dish 6 is controlled by the tracking equipment to transmit signals to and receive signals from the satellite 7. The component of the velocity of the satellite in the direction of the aerial of the transmitter gives rise to a change in transmission time which is assessed and utilised to vary the added time delay so that an overall transmission time is obtained which is constant.

To maintain continuity of communication between two ground stations, several satellites are required, their relative positions in orbit being such that before one satellite has passed beyond working range another is within working range. It is highly desirable, and for some purposes essential, to ensure that the changeover from one satellite to another is effected without interruption of the continuity of the received signal and it is therefore necessary that the total transmission time remains the same for all the satellites. This is conveniently achieved by employing several transmitters, drums, receivers, aerials and parts of the associated control equipment, and arranging that modulating signals at terminal 1 are applied simultaneously to the several drums and hence to the several transmitters and aerials. Switch S1 serves to connect the output of the receiver in use to the utilising circuit.

As indicated in FIG. 1, the components 14–18 are common to the several sets of time delay control equipment so that the total transmission time remains the same for all satellites.

The baseband signal applied to terminal 1 in FIG. 1 comprises a plurality of separate channels spaced in frequency from one another, the delay represented by the distance round drum 3 between heads 2 and 4 then being inserted in the path common to all those channels. Alternatively, and as shown diagrammatically in FIG. 2, the channels may be transmitted along a number of separate paths brought together by suitable multiplexing equipment indicated by block 25 and applied to transmitter 5. In that case, each of the separate paths includes its own transmission delay unit, the units all being controlled by the output from switch S2. The output of receiver 8 is likewise coupled to the inputs of a plurality of sub-band equipments via multiplexing equipment indicated by block 26.

Doppler shift of the carrier frequency may be compensated by automatically controlling the frequency of the carrier oscillator at transmitter 5 and/or by using a receiver having automatic frequency control which enables the receiver to follow frequency changes in a recevied carrier.

One particular method is shown in FIG. 3. Bandpass filters 27 and 28 enable the frequency of the pilot carrier before addition of the time delay represented by that part of the surface of drum 3 between heads 2 and 4 to be compared in a frequency comparator circuit 29 with the pilot carrier frequency after addition of that delay. The rate of change of added delay is equal and opposite to the rate of change of radio transmission time from transmitter to satellite 7 and therefore the output of comparator 29 can be used as shown to control the frequency of the R.F. carrier oscillator of transmitter 5.

The output of comparator 29 is also applied to receiver 8 where it is used to control the frequency of the R.F. frequency changer oscillator in such manner as to enable the receiver to follow incoming frequency variations.

FIG. 4 shows in diagrammatic form part of a system employing a method of compensating variation of radio transmission time from transmitter to receiver which is different from that shown in FIG. 1.

The method employs a comparison between frequencies. A pilot carrier generator 30 is connected via band-pass filter 31 to the input of transmitter 5 where the pilot carrier signal modulates the R.F. carrier of the transmitter. The output of the generator 30 is also applied to phase shifting networks 32, 33 of which network 32 imparts a phase shift of +45° and network 33 a phase shift of −45°. The output of the network 32 is inductively coupled to the inputs of two beat detectors 34, 35 and in similar fashion the output of network 33 is inductively coupled to the inputs of two further beat detectors 36, 37.

After reception and demodulation in receiver 8, the received pilot carrier signal is selected by band-pass filter 38 and applied to the centre taps of windings 39, 40 whose ends are joined as shown in the beat detectors 34 . . . 37.

Thus, each beat detector receives an input from the filter 38 and from the oscillator 30. The inputs from filter 38 are all in phase but the inputs from oscillator 30 are phase shifted, first, by networks 32 and 33 and, second, by taking outputs from opposite ends of the windings 39, 40. The beat detectors are square law rectifiers and their outputs are applied to the stator coils 41 of a four-phase variable reluctance motor in such a way that the strongest pole of the stator is diagonally opposite to the weakest. The four stator poles alternate NSNS and they vary in magnetic strength as the current in their windings varies according to the output of the beat detectors.

The rotor (not shown) of the motor has an odd number of poles and sets itself in the position of minimum reluctance, i.e. with one of its poles in line with the magnetically strongest pole of the stator poles. When the difference in frequency between the output of oscillator 30 and of filter 38 is 1 c./s., each pole of the stator becomes magnetically strongest in turn during one second, and the rotor rotates through the angle subtended by one pole. The direction of rotation of the rotor depends upon the sign of the frequency difference and the position of rest depends upon the relative phase of the inputs to the beat detectors.

The rotor is coupled to the arm 12 by a coupling indicated diagrammatically by dotted line 42.

Alternatively, the output of the pilot carrier generator 30 is applied via the band-pass filter to the recording head 2 and after transmission to and reception from the satellite is selected from the output of readout head 10 by filter 35, switches S3 and S4 being provided for switching in the circuitry just described and switching out the alternative connections.

Instead of using the pilot generator to modulate the carrier of transmitter 5, the pilot generator may provide a radio frequency signal which is fed directly to the dish 6.

The satellites are used in a system having a number of ground stations. The incorporation of the invention enables both carrier and sideband signals to be received at the satellite in their correct relative positions, i.e. with the frequencies they would have in a normal surface system, and thus allows transmissions from different ground stations to be "stacked" alongside one another in the satellite receiver with the minimum frequency spacing between transmissions. Thus, there is no "stretching" or "contraction" of baseband modulating signals transmitted via satellites and consequently there is no loss of quality in multi-channel telephone transmissions and difficulties arise in reception of signalling tones and V.F. telegraph signals as a result of the Doppler effect.

The constant overall delay permits the uninterrupted transmission of monochrome or colour television signals via a satellite communication system with no significant discontinuties when switching between the several satellities which will be necessary in most practical satellite communication systems.

The invention may be embodied to advantage in systems employing conventional methods of modulation, for example frequency modulation, double-sideband amplitude modulation and single-sideband techniques and in systems using pulsed methods of transmission including pulse-code-modulation, since transmissions from a number of different ground stations may be accurately interleaved in time at the satellite receiver.

The avoidance of the "baseband-stretch" effect caused by Doppler shift enables the channels of a broadband multi-channel telephony transmission to be assembled in the conventional manner used in terrestrial radio relay systems without entailing the use of additional pilot carriers or the separation of the blocks of channels that might otherwise be necessary.

In a satellite communication system embodying the invention in which telegraphy and/or data circuits are to be transmitted from a first ground station to a second ground station via a satellite, return circuits via the satellite are also provided in the direction from the second station to the first, as would be essential for example if the circuits formed part of a traffic network including telephony circuits. Equal but continuously variable delays are inserted in both the transmit and receive paths at the first ground station to compensate exactly for the varying delay in that part of the total radio transmission paths between the first station and the satellite. Similarly, equal but continuously variable delays are inserted in both the transmit and receive paths at the second ground station to compensate for the varying delay in that part of the total circuit path between the second station and the satellite. Similar arrangements are adopted at all the ground stations of a multi-station system. In that manner, all parts of all circuits relayed via the satellite are provided with the necessary delay to achieve a constant overall transmission time for any circuit between any pair of ground stations. The system outlined thus permits a satisfactory operation of the satellite on a multi-station basis.

We claim:

1. A ground station for a broadband, multi-channel satellite communication system, said ground station comprising in combination, a radio transmitter, a broadband modulating signal input connected to said radio transmitter, an aerial connected to said radio transmitter, a first variable transmission time delay unit connected in circuit between said broadband modulating signal input and said aerial to vary the transmission time of said broadband modulating signal from said input to said aerial, a radio receiver, a demodulated broadband signal output connected to said radio receiver, a second variable transmission time delay unit for varying the transmission time taken by signals received by the ground station to pass to said demodulated broadband signal output and a transmission time assessing circuit which assesses the total transmission time of signals transmitted from the ground station to a satellite and back to the same ground station and is connected to said first and second variable transmission time delay units to cause an increase in the said total transmission time to a value which is constant irrespective of changes in said total transmission time.

2. A ground station for a broadband, multi-channel satellite communication system, said ground station comprising in combination a radio transmitter, a broadband modulating signal input connected to said radio transmitter, a first variable transmission time delay unit interposed in the connection between said broadband modulating signal input and said radio transmitter, a radio receiver, a demodulated broadband signal output connected to said radio receiver, a second variable transmission time delay unit connected to said broadband signal output, and a transmission time assessing circuit which assesses the total transmission time of signals transmitted from the ground station to the satellite and back to the said ground station, said assessing circuit being connected to said first and second variable transmission time delay units to set the latter to insert equal additional time delays of a value dependent upon said total transmission time and which increase said total transmission time to a value which remains constant irrespective of changes in said total transmission time.

3. A ground station for a broadband, multi-channel satellite communication system, said ground station comprising in combination a radio transmitter, a plurality of modulating signal channels connected to said radio transmitter, a plurality of first variable transmission time delay units, each said first variable transmission time being connected in one only of said modulating signal channels, a radio receiver, a plurality of demodulated signal outputs connected to said radio receiver, a plurality of second variable transmission time delay units, each of said second variable transmission time delay units being connected between said radio receiver and one of said demodulated signal outputs, and, a transmission time assessing circuit which assesses the total transmission time of signals transmitted from the ground station to the satellite and back to the same ground station, said assessing circuit being connected to all said first and second variable transmission time delay units in order to set each of the latter to a time delay dependent on said total transmission time and which, when added to said total transmission time increases the latter to a value which is constant irrespective of changes in said total transmission time.

4. A ground station for a broadband, multi-channel communication system, said ground station comprising in combination, a radio transmitter, a broadband, modulating signal input connected to said radio transmitter, an aerial connected to said transmitter, a first, variable storage time, magnetic, signal-storing device connected between said broadband modulating signal input and said aerial to store signals for a predetermined period of time and then to release them, a radio receiver, a broadband, demodulated signal output connected to said receiver, a second, variable storage time, magnetic, signal storing device for storing signals received by said receiver for a predetermined period of time and then releasing them to said broadband, demodulated signal output, and, a transmission time assessing circuit for assessing the total transmission time of signals transmitted from the ground station to a satellite and back to the same ground station, said transmission time assessing circuit being connected to said first and second signal-storing devices to set the latter to store signals for equal periods of time which when added to said total transmission time increase the latter to a value which is held constant irrespective of changes in said total transmission time.

5. A system as claimed in claim 4 and further comprising, in both first and second signal-storing devices, a record head and a read-out head, and a linkage interconnecting one of the heads of the first signal-storing device with one of the heads of the second signal-storing device to effect synchronous movement of the interconnected heads relatively to the other heads.

6. A system as claimed in claim 1 and further comprising a pilot signal generator connected to said radio transmitter as a modulating signal input, a received pilot signal output connected to said receiver, and a frequency comparing circuit connected to said pilot signal generator and to said pilot signal output for comparing the frequency of said pilot signal generator with the received pilot signal on said received pilot signal output thereby to assess said total transmission time.

7. A system as claimed in claim 1 and further comprising a test signal generator connected to said transmitter, a received test signal output connected to said receiver, a phase comparison circuit connected to said test signal generator and to said received test signal output for comparing the phase of the test signal generator with that of signals on said received test signal output and thereby to assess said total transmission time.

References Cited

UNITED STATES PATENTS

| | | | |
|---|---|---|---|
| 2,719,877 | 10/1955 | Treadwell et al. | 325—58 X |
| 2,903,692 | 9/1959 | Morgan et al. | 325—58 X |
| 2,941,035 | 6/1960 | Hanalka | 179—100.2 |
| 2,974,222 | 3/1961 | Lawson | 325—17 |
| 3,128,465 | 4/1964 | Brilliant | 325—58 X |
| 3,145,341 | 8/1964 | Andrew | 325—473 X |

JOHN W. CALDWELL, *Primary Examiner.*

DAVID G. REDINBAUGH, *Examiner.*